US012609538B2

(12) United States Patent
Wang et al.

(10) Patent No.: US 12,609,538 B2
(45) Date of Patent: Apr. 21, 2026

(54) ENERGY MANAGEMENT SYSTEM INCLUDING A POWER SUPPLY CIRCUIT WITHOUT A CHARGING LOOP

(71) Applicant: Gree Electric Appliances, Inc. of Zhuhai, Zhuhai (CN)

(72) Inventors: Jing Wang, Zhuhai (CN); Meng Huang, Zhuhai (CN); Shangxian Feng, Zhuhai (CN); Mingzhao Fang, Zhuhai (CN); Chenghao Cui, Zhuhai (CN); Mingqiang Sheng, Zhuhai (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 659 days.

(21) Appl. No.: 18/016,387

(22) PCT Filed: Jul. 12, 2021

(86) PCT No.: PCT/CN2021/105766
    § 371 (c)(1),
    (2) Date: Jan. 16, 2023

(87) PCT Pub. No.: WO2022/077975
    PCT Pub. Date: Apr. 21, 2022

(65) Prior Publication Data
    US 2023/0283098 A1     Sep. 7, 2023

(30) Foreign Application Priority Data
    Oct. 16, 2020    (CN) .......................... 202011111589.4

(51) Int. Cl.
    *H02J 7/06*        (2006.01)
    *H02J 7/34*        (2006.01)
    *H02J 7/35*        (2006.01)

(52) U.S. Cl.
    CPC ................ *H02J 7/06* (2013.01); *H02J 7/345* (2013.01); *H02J 7/35* (2013.01)

(58) Field of Classification Search
    CPC ....................................................... H02J 7/06
                        (Continued)

(56) References Cited

U.S. PATENT DOCUMENTS 10,277,144 B2    4/2019  Soeiro et al.
2014/0306666 A1*  10/2014  Choi ..................... H02J 7/0016
                                                320/134
                        (Continued)

FOREIGN PATENT DOCUMENTS

CN          102015355 A        4/2011
CN          201830136 A        5/2011
                        (Continued)

*Primary Examiner* — Yalkew Fantu
(74) *Attorney, Agent, or Firm* — The Webb Law Firm

(57)          ABSTRACT

The present disclosure provides a power supply circuit without a charging loop, and a power management system. The power supply circuit comprises an alternating current switch component, a photovoltaic switching component and a direct-current bus capacitor. The alternating current switch component is configured to electrically connect a live wire of a three-phase alternating current to a direct-current bus, and cause, when an alternating current is selected to charge the direct-current bus capacitor, a voltage across two ends of a direct-current bus capacitor to steadily rise to a target voltage. The photovoltaic switching component is configured to electrically connect a photovoltaic power supply to the direct-current bus, and cause, when the photovoltaic power supply is selected to charge the direct-current bus capacitor, the voltage across the two ends of the direct-current bus capacitor to steadily rise to the target voltage. The direct-current bus capacitor is electrically connected between a positive electrode and a negative electrode of the direct-current bus. When the alternating current or the
                        (Continued)

photovoltaic power supply is electrically connected to the direct-current bus, the alternating current switch component or the photovoltaic switching component can control the voltage across the two ends of the direct-current bus capacitor to stably rise to the target voltage, thereby preventing causing damage to components on the direct-current bus by a large impact current generated by a rapid rise of the voltage across the two ends of the direct-current capacitor.

9 Claims, 2 Drawing Sheets

(58) Field of Classification Search
USPC .......................................................... 320/101
See application file for complete search history.

(56) References Cited

U.S. PATENT DOCUMENTS

2017/0113567 A1*  4/2017  Koketsu ................ B60L 15/007
2020/0203985 A1*  6/2020  Tagawa .................... H02J 7/34

FOREIGN PATENT DOCUMENTS

| | | | |
|---|---|---|---|
| CN | 102884695 | A | 1/2013 |
| CN | 104135020 | A | 11/2014 |
| CN | 204928192 | U | 12/2015 |
| CN | 107404222 | A | 11/2017 |
| CN | 108258677 | A | 7/2018 |
| CN | 110024250 | A | 7/2019 |
| CN | 110690813 | A | 1/2020 |
| CN | 210167966 | U | 3/2020 |
| CN | 111130068 | A | 5/2020 |
| CN | 111313676 | A | 6/2020 |
| CN | 112271800 | A | 1/2021 |
| CN | 213637166 | U | 7/2021 |
| EP | 2646841 | B1 | 5/2016 |
| EP | 3349343 | A1 | 7/2018 |
| EP | 3413431 | A1 | 12/2018 |
| JP | 2005341722 | A | 12/2005 |
| KR | 1020080016123 | A | 2/2008 |
| WO | 2012124510 | A1 | 9/2012 |

* cited by examiner

Cement Resistor

ENERGY MANAGEMENT SYSTEM INCLUDING A POWER SUPPLY CIRCUIT WITHOUT A CHARGING LOOP

CROSS-REFERENCE TO RELATED APPLICATIONS

This application is the United States national phase of PCT/CN2021/105766 filed Jul. 12, 2021, and claims priority to Chinese Patent Application No. 202011111589.4, filed Oct. 16, 2020, the disclosures of which are incorporated herein by reference in their entireties.

BACKGROUND OF THE INVENTION

Field of the Invention

The present disclosure relates to the field of charging technology, and more particularly, to a power supply circuit without a charging loop, and a power management system.

Description of Related Art

In an energy management system, direct-current bus open technologies are adopted more and more frequently. Opening the direct-current bus of the system can facilitate rendezvous and docking of various energy forms, greatly improve operation efficiency of the energy management system and simplify equipment configuration.

In the application of the direct-current bus open technologies, to maintain voltage stability of the direct-current bus, it is generally necessary to configure a large capacity of direct-current bus capacitor. At the moment when different forms of energy sources are switched into the direct-current bus, due to the existence of the direct-current bus capacitor, according to I=C*(du/dt), it can be seen that a large impact current will be generated on the direct-current bus capacitor at the moment of energy switch, which will cause damages to the bus capacitor and components in a main circuit, trip-out of a power supply or the like, and may even cause fire, explosion and other safety accidents.

Therefore, it is necessary to control the impact current generated when the energy sources are switched into the direct-current bus, so as to avoid damages to the components and potential safety hazards.

SUMMARY OF THE INVENTION

Embodiments of the present disclosure provide a power supply circuit without a charging loop, and a power management system, for solving the problem of a larger impact current generated at the moment that different energy sources are switched into a direct-current (DC) bus.

According to a first aspect of the present disclosure, there is provided a power supply circuit without a charging loop, including:

an alternating current switch component configured to electrically connect a live wire of a three-phase alternating current to a direct-current bus, and cause, when an alternating current is selected to charge a direct-current bus capacitor, a voltage across two ends of the direct-current bus capacitor to steadily rise to a target voltage;

a photovoltaic switching component configured to electrically connect a photovoltaic power supply to the direct-current bus, and cause, when the photovoltaic power supply is selected to charge the direct-current bus capacitor, the voltage across the two ends of the direct-current bus capacitor to steadily rise to the target voltage; and the direct-current bus capacitor electrically connected between a positive electrode and a negative electrode of the direct-current bus.

In some embodiments, a first live wire of the three-phase alternating current is electrically connected to a positive electrode of the direct-current bus through a first switch in the alternating current switch component, and is electrically connected to a negative electrode of the direct-current bus through a second switch in the alternating current switch component;

a second live wire of the three-phase alternating current is electrically connected to the positive electrode of the direct-current bus through a third switch in the alternating current switch component, and is electrically connected to the negative electrode of the direct-current bus through a fourth switch in the alternating current switch component;

a third live wire of the three-phase alternating current is electrically connected to the positive electrode of the direct-current bus through a fifth switch in the alternating current switch component, and is electrically connected to the negative electrode of the direct-current bus through a sixth switch in the alternating current switch component; and a seventh switch in the alternating current switch component is in inverse parallel connection to the first switch, an eighth switch is in inverse parallel connection to the third switch, a ninth switch is in inverse parallel connection to the fifth switch, a tenth switch is in inverse parallel connection to the second switch, an eleventh switch is in inverse parallel connection to the fourth switch, and a twelfth switch is in inverse parallel connection to the sixth switch.

In some embodiments, the seventh switch to the twelfth switch are classified into three groups of switches; each group includes any one of the seventh switch, the eighth switch and the ninth switch, and any one of the tenth switch, the eleventh switch and the twelfth switch; and when the three-phase alternating current charges the direct-current bus capacitor, the three groups of switches are configured to be alternately turned on, and the first switch to the sixth switch are in an off state.

In some embodiments, the first switch to the twelfth switch are insulated gate bipolar translators.

In some embodiments, grid electrodes of the first to sixth switches are electrically connected to a first drive signal terminal, a collector electrode of the first switch is electrically connected to the positive electrode of the direct-current bus, and an emitter electrode of the first switch is electrically connected to the first live wire;

a collector electrode of the seventh switch is electrically connected to the emitter electrode of the first switch, and an emitter electrode of the seventh switch is electrically connected to the collector electrode of the first switch; a collector electrode of the second switch is electrically connected to the first live wire, and an emitter electrode of the second switch is electrically connected to the negative electrode of the direct-current bus;

a collector electrode of the tenth switch is electrically connected to the emitter electrode of the second switch, and an emitter electrode of the tenth switch is electrically connected to the collector electrode of the second switch; a collector electrode of the third switch is electrically connected to the positive electrode of the direct-current bus, and an emitter electrode of the third switch is electrically connected to the second live wire; a collector electrode of the eighth switch is electrically connected to the emitter electrode of the third switch, and an emitter electrode of the eighth switch is electrically connected to the collector electrode of the third switch; a collector electrode of the fourth switch is electrically connected to the second live wire, and an emitter electrode of the fourth switch is electrically connected to the negative electrode of the direct-current bus;

a collector electrode of the eleventh switch is electrically connected to the emitter electrode of the fourth switch, and an emitter electrode of the eleventh switch is electrically connected to the collector electrode of the fourth switch; a collector electrode of the fifth switch is electrically connected to the positive electrode of the direct-current bus, and an emitter electrode of the fifth switch is electrically connected to the third live wire;

a collector electrode of the ninth switch is electrically connected to the emitter electrode of the fifth switch, and an emitter electrode of the ninth switch is electrically connected to the collector electrode of the fifth switch; and a collector electrode of the sixth switch is electrically connected to the third live wire, and an emitter electrode of the sixth switch is electrically connected to the negative electrode of the direct-current bus; a collector electrode of the twelfth switch is electrically connected to the emitter electrode of the sixth switch, and an emitter electrode of the twelfth switch is electrically connected to the collector electrode of the sixth switch.

In some embodiments, the photovoltaic switching component includes a thirteenth switch and a fourteenth switch; the thirteenth switch is electrically connected between a positive electrode of the photovoltaic power supply and the positive electrode of the direct-current bus; and the fourteenth switch is electrically connected between a negative electrode of the photovoltaic power supply and the negative electrode of the direct-current bus.

In some embodiments, both the thirteenth switch and the fourteenth switch are insulated gate bipolar translators; a collector electrode of the thirteenth switch is electrically connected to the positive electrode of the photovoltaic power supply, an emitter electrode of the thirteenth switch is electrically connected to the positive electrode of the direct-current bus, and a grid electrode of the thirteenth switch is electrically connected to a second drive signal terminal; and an emitter electrode of the fourteenth switch is electrically connected to the negative electrode of the photovoltaic power supply, a collector electrode of the fourteenth switch is electrically connected to the negative electrode of the direct-current bus, and a grid electrode of the fourteenth switch is electrically connected to the second drive signal terminal.

In some embodiments, the drive signal is a pulse width modulation signal.

In some embodiments, the power supply circuit without the charging loop further includes a voltage detector configured to detect a voltage across the positive electrode and the negative electrode of the direct-current bus.

According to a second aspect of the present disclosure, there is provided an energy management system, which includes the power supply circuit without the charging loop in the above embodiments.

In the above embodiments of the present disclosure, the three-phase alternating current is electrically connected to the direct-current bus through the alternating current switch component. When the three-phase alternating current charges the direct-current bus capacitor, the voltage across the two ends of the direct-current bus capacitor are controlled to stably rise to the target voltage, thereby preventing causing damage to components on the direct-current bus by a larger impact current generated by a rapid rise of the voltage across the two ends of the direct-current capacitor when the three-phase alternating current is switched into the direct-current bus. The photovoltaic power supply is electrically connected to the direct-current bus through the photovoltaic switching component. When the photovoltaic power supply charges the direct-current bus capacitor, the voltage across the two ends of the direct-current bus capacitor are controlled to rise steadily to the target voltage, thereby preventing causing damage to the components on the direct-current bus by a larger impact current generated by a rapid rise of the voltage across the two ends of the direct-current capacitor when the photovoltaic power supply is switched into the direct-current bus.

BRIEF DESCRIPTION OF THE DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DESCRIPTION OF THE INVENTION

To make the objectives, technical solutions and advantages of the present disclosure clearer, the technical solutions of the present disclosure will be described in detail below. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

To solve adverse effects of a larger impact current generated when energy is cut into a direct-current bus on the direct-current bus, following four methods are generally adopted in related technologies.

Figure 1:
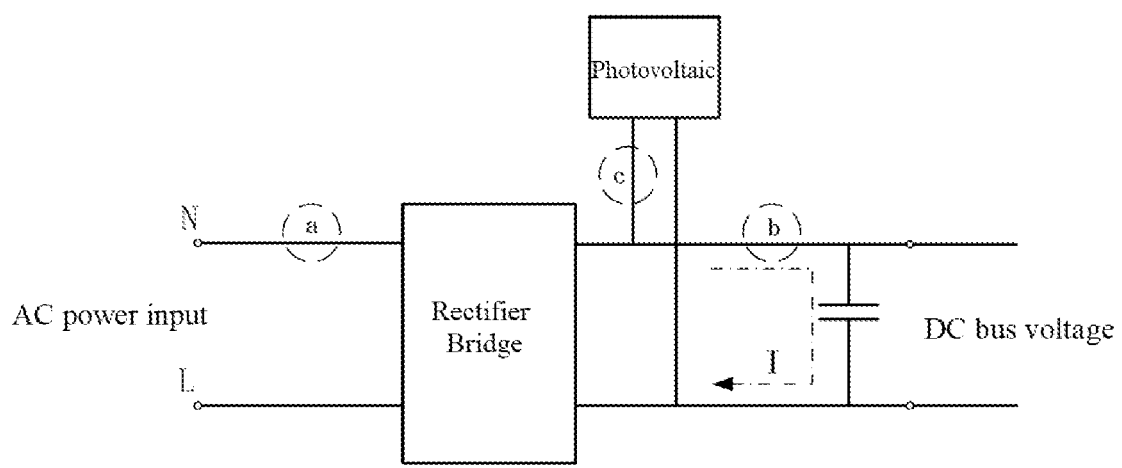
FIG. 1 is a schematic diagram of a direct-current bus power supply circuit in related technologies.

The first one is, a negative temperature coefficient (NTC) thermistor is connected in series at a, b or c as shown in FIG. 1. At the moment of charging, the NTC thermistor plays a current limiting role in a charging loop, such that a charging current I of a direct-current bus capacitor is not too large. As a direct-current bus voltage is gradually established, the charging current I gradually decreases to zero, and the charging is completed. However, the NTC thermistor is always connected in series in a main circuit, it will continue to generate heat, which is not conducive to improvement of system efficiency. In addition, when a resistance value of the NTC is too large, loss is very large; but when the resistance value is too small, the current limiting role is poor.

Figure 2:
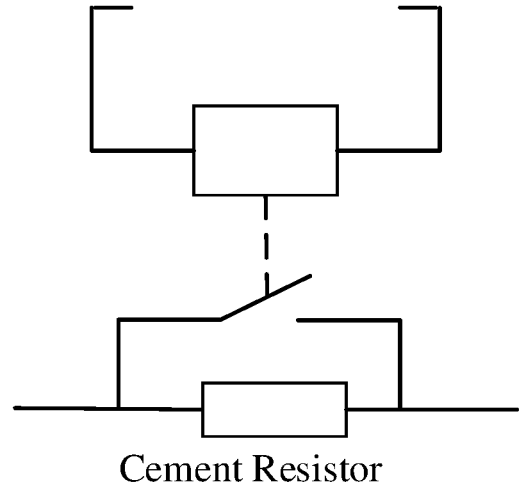
FIG. 2 is a schematic diagram of a charging loop control circuit in the related technologies.

The second one is, a charging loop control circuit shown in FIG. 2 is additionally provided at a, b or c shown in FIG. 1. Specifically, a cement resistor is connected in series to the charging loop, and a normally open relay is connected in parallel to the cement resistor. At the moment of charging, the cement resistor plays the role of current limiting. After the direct-current bus voltage is established, the relay connected in parallel with the cement resistor is turned off by an external control signal, such that the cement resistor is switched off from the main circuit. By controlling switch-in and switch-off of the charging loop, the impact current at the moment of power-on can be suppressed, and continuous heating of a charging resistor can also be avoided. However, this method introduces the charging loop control circuit, the structure of the circuit is complex, and after the charging is completed, a coil of the relay is always in a power-on state, and the relay generates serious heat and thus losses are higher.

Figure 3:
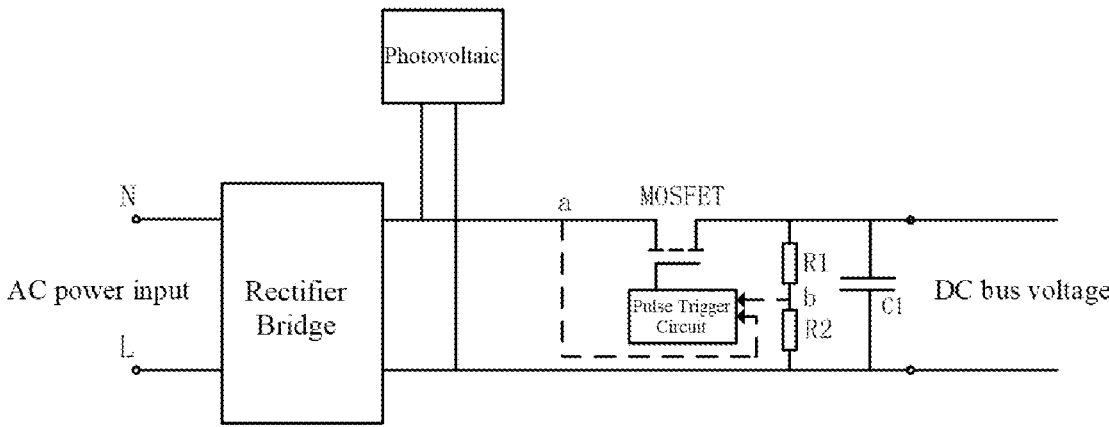
FIG. 3 is a schematic diagram of another direct-current bus power supply circuit in the related technologies.

The third one is, a metal-oxide-semiconductor field-effect transistor (MOSFET) is connected in series in the main circuit of the direct-current bus to serve as a switch, as shown in FIG. 3. The MOSFET is controlled to be on or off by means of a pulse signal outputted from a pulse trigger, to charge the direct-current bus capacitor in the form of pulse. The method can slowly charge the direct-current bus capacitor in a controlled way, which is relatively safer. However, the load connected to the direct-current bus is large, and in a normal working state, the MOSFET cannot be switched off from the main circuit, the current flowing through the MOSFET is large, which leads to serious heating of the MOSFET, therefore, in one aspect, this increases energy loss, and in another aspect, a large amount of heat also brings huge hidden dangers to working reliability of the MOSFET. What's more, this method cannot effectively cut off and isolate a photovoltaic power supply in fault.

All of the above methods have certain disadvantages. Therefore, embodiments of the present disclosure provide a power supply circuit without a charging loop, so as to solve the problem that a larger impact current is generated at the moment when different energy sources are switched into the direct-current bus, and solve the problem of serious heating.

Figure 4:
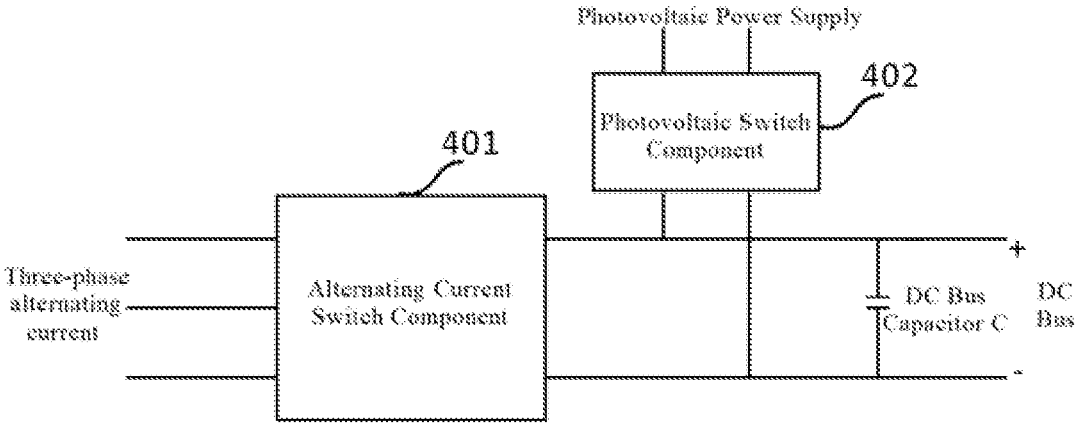
FIG. 4 is a schematic diagram of a power supply circuit without a charging loop according to some embodiments of the present disclosure.

Embodiments of the present disclosure provide a power supply circuit without a charging loop. As shown in FIG. 4, the circuit includes an alternating current (AC) switch component 401, a photovoltaic switching component 402, and a direct-current (DC) bus capacitor C.

The direct-current bus capacitor C is electrically connected between a positive electrode and a negative electrode of a direct-current bus.

The alternating current switch component 401 is configured to electrically connect a live wire of a three-phase alternating current to the direct-current bus, and cause, when the alternating current is selected to charge the direct-current bus capacitor C, a voltage across two ends of the direct-current bus capacitor C to steadily rise to a target voltage.

The photovoltaic switching component 402 is configured to electrically connect a photovoltaic power supply to the direct-current bus, and cause, when the photovoltaic power supply is selected to charge the direct-current bus capacitor C, the voltage across the two ends of the direct-current bus capacitor C to steadily rise to the target voltage.

In the above embodiments of the present disclosure, the three-phase alternating current is electrically connected to the direct-current bus through the alternating current switch component. When the three-phase alternating current charges the direct-current bus capacitor, the voltage across the two ends of the direct-current bus capacitor are controlled to stably rise to the target voltage, thereby preventing causing damage to components on the direct-current bus by a larger impact current generated by a rapid rise of the voltage across the two ends of the direct-current capacitor when the three-phase alternating current is switched into the direct-current bus. The photovoltaic power supply is electrically connected to the direct-current bus through the photovoltaic switching component. When the photovoltaic power supply charges the direct-current bus capacitor, the voltage across the two ends of the direct-current bus capacitor are controlled to rise steadily to the target voltage, thereby preventing causing damage to the components on the direct-current bus by a larger impact current generated by a rapid rise of the voltage across the two ends of the direct-current capacitor when the photovoltaic power supply is switched into the direct-current bus.

Figure 5:
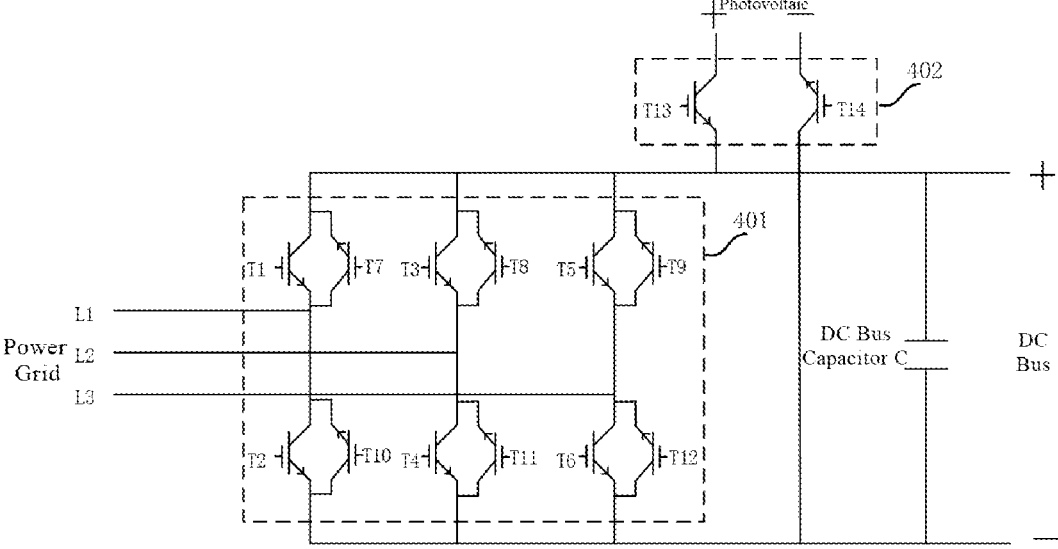
FIG. 5 is a schematic diagram of a power supply circuit without a charging loop according to some other embodiments of the present disclosure.

In some embodiments, the power supply circuit without the charging loop provided by the embodiments of the present disclosure is as shown in FIG. 5, and the alternating current switch component 401 includes a first switch T1 to a twelfth switch T12.

Specifically, a first live wire L1 of the three-phase alternating current is electrically connected to the positive electrode of the direct-current bus through the first switch T1 in the alternating current switch component 401, and is electrically connected to the negative electrode of the direct-current bus through the second switch T2 in the alternating current switch component 401.

A second live wire L2 of the three-phase alternating current is electrically connected to the positive electrode of the direct-current bus through the third switch T3 in the alternating current switch component 401, and is electrically connected to the negative electrode of the direct-current bus through the fourth switch T4 in the alternating current switch component 401.

A third live wire L3 of the three-phase alternating current is electrically connected to the positive electrode of the direct-current bus through the fifth switch T5 in the alternating current switch component 401, and is electrically connected to the negative electrode of the direct-current bus through the sixth switch T6 in the alternating current switch component 401.

The seventh switch T7 in the alternating current switch component 401 is in inverse parallel connection to the first switch T1, the eighth switch T8 is in inverse parallel connection to the third switch T3, the ninth switch T9 is in inverse parallel connection to the fifth switch T5, the tenth switch T10 is in inverse parallel connection to the second switch T2, the eleventh switch T11 is in inverse parallel connection to the fourth switch T4, and the twelfth switch T12 is in inverse parallel connection to the sixth switch T6.

In some embodiments, the seventh switch T7 to the twelfth switch T12 are classified into three groups in advance. Each group includes any one of the seventh switch T7, the eighth switch T8 and the ninth switch T9, and any one of the tenth switch T10, the eleventh switch T11 and the twelfth switch T12. Specifically, how to group may be determined according to algorithms, and may also be changed, as long as any one of T7, T8 and T9 is matched with any one of T10, T11 and T12.

When the three-phase alternating current is switched on, i.e., when the three-phase alternating current charges the direct-current bus capacitor, the above three groups of switches (T7 to T12) are alternately turned on, and the first to sixth switches T1 to T6 are in an off state. For example, the seventh switch T7 and the twelfth switch T12 are classified into one group, the eighth switch T8 and the eleventh switch T11 are classified into one group, and the ninth switch T9 and the tenth switch T10 are classified into one group. When the three-phase alternating current is needed to charge the direct-current bus capacitor, the seventh switch T7 and the twelfth switch T12 may be turned on for several microseconds, then the eighth switch T8 and the eleventh switch T11 are turned on for several microseconds and the seventh switch T7 and the twelfth switch T12 are turned off, and next, the ninth switch T9 and the tenth switch T10 are turned on for several microseconds and the eighth switch T8 and the eleventh switch T11 are turned off.

In some embodiments, the power supply circuit without the charging loop further includes a voltage detector, which is configured to detect a voltage across the positive electrode and the negative electrode of the direct-current bus. When the three-phase alternating current or the photovoltaic power supply is employed to charge the direct-current bus capacitor C, the voltage across the positive electrode and the negative electrode of the direct-current bus is detected by the voltage detector, so as to determine whether the charging of the direct-current bus capacitor C is completed.

For example, the first switch T1 to the twelfth switch T12 are all insulated gate bipolar transistors (IGBTs). The IGBT has advantages of good thermal stability and large safe working area.

Accordingly, when all the switches in the alternating current switch component 401 are the IGBTs, a specific connection relationship therebetween may be as follows.

Grid electrodes of the first to sixth switches T1 to T6 are electrically connected to a first drive signal terminal. The first switch T1 to the sixth switch T6 are turned off or turned on simultaneously under the driving of the first drive signal. When the three-phase alternating current is employed to charge the direct-current bus capacitor C, the first switch T1 to the sixth switch T6 are turned off by the first drive signal.

A collector electrode of the first switch T1 is electrically connected to the positive electrode of the direct-current bus, and an emitter electrode of the first switch T1 is electrically connected to the first live wire L1. A collector electrode of the seventh switch T7 is electrically connected to the emitter electrode of the first switch T1, and an emitter electrode of the seventh switch T7 is electrically connected to the collector electrode of the first switch T1.

A collector electrode of the second switch T2 is electrically connected to the first live wire L1, and an emitter electrode of the second switch T2 is electrically connected to the negative electrode of the direct-current bus. A collector electrode of the tenth switch T10 is electrically connected to the emitter electrode of the second switch T2, and an emitter electrode of the tenth switch T10 is electrically connected to the collector electrode of the second switch T2.

A collector electrode of the third switch T3 is electrically connected to the positive electrode of the direct-current bus, and an emitter electrode of the third switch T3 is electrically connected to the second live wire L2. A collector electrode of the eighth switch T8 is electrically connected to the emitter electrode of the third switch T3, and an emitter electrode of the eighth switch T8 is electrically connected to the collector electrode of the third switch T3.

A collector electrode of the fourth switch T4 is electrically connected to the second live wire L2, and an emitter electrode of the fourth switch T4 is electrically connected to the negative electrode of the direct-current bus. A collector electrode of the eleventh switch T11 is electrically connected to the emitter electrode of the fourth switch T4, and an emitter electrode of the eleventh switch T11 is electrically connected to the collector electrode of the fourth switch T4.

A collector electrode of the fifth switch T5 is electrically connected to the positive electrode of the direct-current bus, and an emitter electrode of the fifth switch T5 is electrically connected to the third live wire L3. A collector electrode of the ninth switch T9 is electrically connected to the emitter electrode of the fifth switch T5, and an emitter electrode of the ninth switch T9 is electrically connected to the collector electrode of the fifth switch T5.

A collector electrode of the sixth switch T6 is electrically connected to the third live wire L3, and an emitter electrode of the sixth switch T6 is electrically connected to the negative electrode of the direct-current bus. A collector electrode of the twelfth switch T12 is electrically connected to the emitter electrode of the sixth switch T6, and an emitter electrode of the twelfth switch T12 is electrically connected to the collector electrode of the sixth switch T6.

As previously mentioned, the seventh switch T7 to the twelfth switch T12 may be classified into three groups, in this case, the grid electrodes of each group of switches may be electrically connected to the same drive signal port, or of course, may be electrically connected to different drive signal ports, as long as the drive signals can alternately turn on the three groups of switches.

In some embodiments, as shown in FIG. 5, the photovoltaic switching component 402 includes a thirteenth switch T13 and a fourteenth switch T14. The thirteenth switch T13 is electrically connected between a positive electrode of the photovoltaic power supply and the positive electrode of the direct-current bus, and the fourteenth switch T14 is electrically connected between a negative electrode of the photovoltaic power supply and the negative electrode of the direct-current bus.

In some embodiments, both the thirteenth switch T13 and the fourteenth switch T14 are insulated gate bipolar translators (IGBTs). Specifically, a collector electrode of the thirteenth switch T13 is electrically connected to the positive electrode of the photovoltaic power supply, an emitter electrode of the thirteenth switch T13 is electrically connected to the positive electrode of the direct-current bus, and a grid electrode of the thirteenth switch T13 is electrically connected to a drive signal terminal. An emitter electrode of the fourteenth switch T14 is electrically connected to the negative electrode of the photovoltaic power supply, a collector electrode of the fourteenth switch T14 is electrically connected to the negative electrode of the direct-current bus, and a grid electrode of the fourteenth switch T14 is electrically connected to the drive signal terminal. The drive signal electrically connected to the first switch T13 and the drive signal electrically connected to the second switch T14 may be the same or may be different. When the photovoltaic power supply is switched in, to prevent the photovoltaic power supply from generating a larger current impact on the direct-current bus, the first switch T13 and the second switch T14 may be intermittently turned on by the drive signal. For example, the first switch T13 and the second switch T14 may be turned on simultaneously for several microseconds and then turned off simultaneously, and then the first switch T13 and the second switch T14 are turned on simultaneously, such that the photovoltaic power supply is slowly switched into the direct-current bus. When the direct-current bus voltage slowly rises to the target voltage, the first switch T13 and the second switch T14 are controlled to be in a normally-closed on state, such that the photovoltaic power supply is in a continuous access state.

In some embodiments, a pulse width modulation (PWM) signal is used as the drive signal of the first switch T13 and the second switch T14, and a switch-in speed of the photovoltaic power supply may be adjusted by adjusting a duty cycle of the PWM.

Based on the same technical idea, embodiments of the present disclosure provide a power management system, which includes the power supply circuit without the charging loop as described in any one of the previous embodiments.

It should be noted that in the description of the embodiments of the present disclosure, the terms "first", "second" and the like are used only for distinctions and are not understood to indicate or imply relative importance or order. Furthermore, in the description of the present disclosure, "a plurality of" means at least two unless otherwise stated.

Obviously, those skilled in the art may alter or modify the present disclosure without departing from the spirit and scope of the present disclosure. Thus, if these alterations and modifications of the present disclosure fall within the scope of claims of the present disclosure and equivalent technologies thereof, the present disclosure is intended to cover these alterations and modifications.

The invention claimed is:

1. A power supply circuit without a charging loop, comprising: a direct-current bus capacitor electrically connected between a positive electrode and a negative electrode of a direct-current bus; an alternating current switch component configured to electrically connect a live wire of a three-phase alternating current to direct-current bus, and cause, when alternating current is selected to charge direct-current bus capacitor, a voltage across two ends of the direct-current bus capacitor to steadily rise to a target voltage; a photovoltaic switching component configured to electrically connect a photovoltaic power supply to the direct-current bus, and cause, when the photovoltaic power supply is selected to charge the direct-current bus capacitor, the voltage across the two ends of the direct-current bus capacitor to steadily rise to the target voltage, wherein, a first live wire of the three-phase alternating current is electrically connected to a positive electrode of the direct-current bus through a first switch in the alternating current switch component, and is electrically connected to a negative electrode of the direct-current bus through a second switch in the alternating current switch component; a second live wire of the three-phase alternating current is electrically connected to the positive electrode of the direct-current bus through a third switch in the alternating current switch component, and is electrically connected to the negative electrode of the direct-current bus through a fourth switch in the alternating current switch component; a third live wire of the three-phase alternating current is electrically connected to the positive electrode of the direct-current bus through a fifth switch in the alternating current switch component, and is electrically connected to the negative electrode of the direct-current bus through a sixth switch in the alternating current switch component; and a seventh switch in the alternating current switch component is in inverse parallel connection to the first switch, an eighth switch is in inverse parallel connection to the third switch, a ninth switch is in inverse parallel connection to the fifth switch, a tenth switch is in inverse parallel connection to the second switch, an eleventh switch is in inverse parallel connection to the fourth switch, and a twelfth switch is in inverse parallel connection to the sixth switch.

2. The power supply circuit without the charging loop according to claim 1, wherein the seventh switch to the twelfth switch are classified into three groups of switches;
    each group comprises any one of the seventh switch, the eighth switch and the ninth switch, and any one of the tenth switch, the eleventh switch and the twelfth switch; and
    when the three-phase alternating current charges the direct-current bus capacitor, the three groups of switches are configured to be alternately turned on, and the first switch to the sixth switch are in an off state.

3. The power supply circuit without the charging loop according to claim 2, wherein the first switch to the twelfth switch are insulated gate bipolar translators.

4. The power supply circuit without the charging loop according to claim 3, wherein grid electrodes of the first to sixth switches are electrically connected to a first drive signal terminal,
    a collector electrode of the first switch is electrically connected to the positive electrode of the direct-current bus, and an emitter electrode of the first switch is electrically connected to the first live wire; a collector electrode of the seventh switch is electrically connected to the emitter electrode of the first switch, and an emitter electrode of the seventh switch is electrically connected to the collector electrode of the first switch;
    a collector electrode of the second switch is electrically connected to the first live wire, and an emitter electrode of the second switch is electrically connected to the negative electrode of the direct-current bus; a collector electrode of the tenth switch is electrically connected to the emitter electrode of the second switch, and an emitter electrode of the tenth switch is electrically connected to the collector electrode of the second switch;
    a collector electrode of the third switch is electrically connected to the positive electrode of the direct-current bus, and an emitter electrode of the third switch is electrically connected to the second live wire; a collector electrode of the eighth switch is electrically connected to the emitter electrode of the third switch, and an emitter electrode of the eighth switch is electrically connected to the collector electrode of the third switch;
    a collector electrode of the fourth switch is electrically connected to the second live wire, and an emitter electrode of the fourth switch is electrically connected to the negative electrode of the direct-current bus; a collector electrode of the eleventh switch is electrically connected to the emitter electrode of the fourth switch, and an emitter electrode of the eleventh switch is electrically connected to the collector electrode of the fourth switch;
    a collector electrode of the fifth switch is electrically connected to the positive electrode of the direct-current bus, and an emitter electrode of the fifth switch is electrically connected to the third live wire; a collector electrode of the ninth switch is electrically connected to the emitter electrode of the fifth switch, and an emitter electrode of the ninth switch is electrically connected to the collector electrode of the fifth switch; and a collector electrode of the sixth switch is electrically connected to the third live wire, and an emitter electrode of the sixth switch is electrically connected to the negative electrode of the direct-current bus; a collector electrode of the twelfth switch is electrically connected to the emitter electrode of the sixth switch, and an emitter electrode of the twelfth switch is electrically connected to the collector electrode of the sixth switch.

5. The power supply circuit without the charging loop according to claim 1, wherein the photovoltaic switching component comprises a thirteenth switch and a fourteenth switch;

the thirteenth switch is electrically connected between a positive electrode of the photovoltaic power supply and the positive electrode of the direct-current bus; and the fourteenth switch is electrically connected between a negative electrode of the photovoltaic power supply and the negative electrode of the direct-current bus.

6. The power supply circuit without the charging loop according to claim 5, wherein both the thirteenth switch and the fourteenth switch are insulated gate bipolar translators;

a collector electrode of the thirteenth switch is electrically connected to the positive electrode of the photovoltaic power supply, an emitter electrode of the thirteenth switch is electrically connected to the positive electrode of the direct-current bus, and a grid electrode of the thirteenth switch is electrically connected to a second drive signal terminal; and an emitter electrode of the fourteenth switch is electrically connected to the negative electrode of the photovoltaic power supply, a collector electrode of the fourteenth switch is electrically connected to the negative electrode of the direct-current bus, and a grid electrode of the fourteenth switch is electrically connected to the second drive signal terminal.

7. The power supply circuit without the charging loop according to claim 6, wherein the drive signal is a pulse width modulation signal.

8. The power supply circuit without the charging loop according to claim 1, further comprising a voltage detector configured to detect a voltage across the positive electrode and the negative electrode of the direct-current bus.

9. An energy management system comprising the power supply circuit without the charging loop according to claim 1.

* * * * *